United States Patent [19]

Goodman

[11] Patent Number: 4,557,942

[45] Date of Patent: Dec. 10, 1985

[54] LOW SODIUM SHAPED FISH PRODUCT

[75] Inventor: Louis P. Goodman, Parsippany, N.J.

[73] Assignee: Mother's Food Products, Inc., Newark, N.J.

[21] Appl. No.: 645,085

[22] Filed: Aug. 28, 1984

[51] Int. Cl.$^4$ .................................. A23L 1/325
[52] U.S. Cl. ................................. 426/574; 426/578; 426/643; 426/513
[58] Field of Search ............... 426/92, 574, 578, 643, 426/513

[56] References Cited

U.S. PATENT DOCUMENTS

| | | | |
|---|---|---|---|
| 1,855,948 | 4/1932 | Drosin | 426/643 X |
| 3,512,993 | 5/1970 | Conley et al. | 426/643 X |
| 3,519,434 | 7/1970 | Schuppner, Jr. | 426/643 X |
| 4,207,355 | 6/1980 | Chiv et al. | 426/578 |
| 4,212,892 | 7/1980 | Chahine et al. | 426/643 X |

*Primary Examiner*—Robert Yoncoskie
*Attorney, Agent, or Firm*—Anothy J. Casella; Gerald E. Hespos

[57] ABSTRACT

An integrally shaped fish product is described. The fish product comprises comminuted fish protein essentially homogeneously dispersed in a gelled matrix binder formed by admixture of water with crosslinked and pregelatinized starch. The fish product retains its shape and integrity despite having less than 40 mg of sodium per 100 grams.

8 Claims, No Drawings

LOW SODIUM SHAPED FISH PRODUCT

BACKGROUND OF THE INVENTION

The present invention relates to shaped foodstuffs composed predominantly of comminuted fish protein. While various such foodstuffs are known, this invention is particularly directed to fish balls and the like, often commonly denominated as "Gefilte Fish".

Such foodstuffs or edible products have generally been prepared through a simple set of steps comprising: forming a mixture of comminuted fish protein, whole eggs or egg whites, starch and assorted condiments and other flavorants; shaping the mixture into the desired form; and then blanching the shaped mixture in a hot aqueous bath. The resultant products may then be eaten or they may be packaged sterilized and stored for later consumption.

Incident to preparation, these foodstuffs have inevitably acquired a high concentration build-up of salt and especially sodium. Sodium chloride is ordinarily incorporated as a flavor enhancer and occasionally as a flavor modifier.

In the case of fish ball preparation, salt acts as an emulsifier to assist in solubilizing the protein thereby effecting binding between the protein particulates. This action thereby increases the integrity of the final shaped products.

In addition, salt is also employed in the blanching bath to prevent sticking of the proteinaceous fish balls and to make the balls more bouyant so that they rise faster from the bottom of the blanching bath.

In recent years, a substantial body of evidence has developed which indicates that high concentrations of salt in the diet may be undesirable. Medical authorities have indicated that the body requirements for sodium are only about 200 mg per day. While amounts substantially in excess of this amount may be tolerated (the guidelines of the Food and Nutrition Board of the National Academy of Sciences National Research Council, for example, allow up to between 1000 and 3300 mg per day), concern has developed that common daily intakes could lead to hypertension and other adverse conditions.

Previous attempts to reduce the sodium content of fish balls and similar foodstuffs have, however, generally proven unsatisfactory. Despite a wealth of other known binding agents which include such hydrocolloids as gum arabic, locust bean gum, xanthan gum, microcrystalline cellulose, carboxy methyl cellulose, pectin and the like, adequate product cohesiveness and/or mouthfeel has been lacking. These substitute products have generally proven either sticky or susceptible to breakage. Also, they have usually had a consistency quite different from conventional products.

There have also been a number of attempts to reduce sodium content in such products by utilization of salt substitutes. Substitutes such as potassium chloride, ammonium chloride or L-Glutamic Acid Hydrochloride have not, however, proven fully successful and/or may themselves be considered undesirable food additives.

SUMMARY OF THE INVENTION

One of the objects of this invention is the production of a low sodium content foodstuff. In particular, it is desired to produce a fish ball or similar composition having less than about 10% of the 390 to 430 mg of sodium per 100 grams of composition ordinarily present in such foodstuffs.

It has been discovered that this objective can be accomplished through the use of a gelled matrix binder formed by admixture of water with crosslinked and pregelatinized starch particles. Substitution of such a starch-based matrix replaces the emulsifier/binder functions normally supplied by sodium chloride in conventional processes and products. Further, other known condiments and flavorants may be employed to compensate for the flavor modifier properties of that salt.

The substitution of such a starch-based matrix in producing the present foodstuffs may be partial, so as only to reduce the need for added salt. Alternatively, the foodstuffs may be produced without any addition of salt so that this product will contain only the 20 to 25 mg of sodium per 100 grams ordinarily imparted through incorporation of the fish protein itself.

An additional advantage of this invention involves the discovery that the present starches also facilitate production of these foodstuffs. While other starches produce sticky and/or pasty fish compositions, these crosslinked and pregelatinized starches do not. Consequently, the fish batter can be properly agglomerated into balls which are more readily handled, thereby reducing the amount of breakage.

The tremendous advantage of the invention becomes even more apparent when the present starches are used in the commercial production of fish balls. Here, the fish emulsion is subjected to the stresses and strains of being forced through various pumps and forming machines. After the balls are formed and blanched they are subjected to handling and movement by both automated machines and human hands. The fish balls survive all this handling with a minimum amount of breakage.

DETAILED DESCRIPTION OF THE INVENTION

The predominate component of the present foodstuffs is normally comminuted fish protein. By this term, it is meant to include the edible meat of any fish, although pike, whitefish, mullet, carp and combinations thereof are preferred.

The fish protein desirably comprises from 40 to 80%, more preferably 65 to 75 percent by total weight of the product foodstuff. It should be in comminuted form and may, for example, simply be coarsely ground. For optimum results, the fish is ground through a steel plate with holes from about 3/16 to 5/16 of an inch in diameter. These parameters result in particularly desirable characteristics of product taste and texture.

The starch utilized in forming the present foodstuffs must be a crosslinked and pregelatinized material. Such starch materials are known and may be produced in accordance with the teachings of U.S. Pat. Nos. 4,207,355; 4,228,199 and 4,229,489 of Chung-Wai Chin et al.

Suitable starch materials may be obtained from any of the usual sources of starch. By way of example only, these include corn, potato, tapioca and wheat.

The starch material must be crosslinked. This may, however, be performed in any conventional manner. Typical crosslinking agents suitable herein are those approved for use in foods such as epichlorohydrin, linear dicarboxylic acid anhydrides, acrolein, phosphorus oxychloride, and soluble metaphosphates. Preferred crosslinking agents are phosphorus epichlorohydrin, adipic-acetic anhydride. Most preferably, phosphorus oxychloride is employed.

The crosslinking reaction itself is carried out according to standard procedures described in the literature for preparing crosslinked granular starches such as that of e.g. U.S. Pat. Nos. 2,328,537 and 2,801,242. The exact reaction conditions employed will, of course, vary with the type of crosslinking agent used as well as the type of starch base, the reaction scale, etc. The reaction between starch and crosslinking agent is preferably carried out in aqueous medium. In this case, the starch is usually slurried in water, adjusted to the proper pH and the crosslinking agent then added The crosslinking reaction may be carried out at temperature of 5° to 60° C. and preferably 20° to 40° C. It will be recognized that use of temperatures above about 60° C. will be undesirable for this purpose. Granule swelling and filtration difficulties or gelatinization of the starch may then occur prematurely so as to impede later processing steps. Reaction time will vary depending mainly on the crosslinking agent and temperature used, but is typically from about 0.2 to 24 hours.

The degree of crosslinking utilized may vary broadly as is customary in the art. Very little crosslinking is, however, required. Ordinarily, a level of one crosslink per each 200 to 1000 glucose units in the starch is employed.

After the crosslinking reaction is complete, the pH of the reaction mixture is generally adjusted to from 5.5 to 6.5 using a common acid. The granular reaction product may be recovered by filtration and washed with water then and dried. However, such a washing step is not necessary for purposes herein, and the crosslinked product may be further processed directly.

In order that the desired gellable starch will be ensured, the Brabender viscosity of the starch as measured at 80° C. should be within a certain range which depends on the solids level used for measurement thereof. Thus, the Brabender viscosity at 80° C. may be up to about 3100 B.U. when measured at 5% solids using a 700 cm-g cartridge, and from about 800 to 1400 B.U. when measured at 7% solids using the same cartridge. It will be recognized that some of the crosslinked starches herein will have a Brabender viscosity at 80° C. which falls within both the ranges specified for the viscosity. Making measurements at two different percent solids levels for viscosity values helps to described optimum characteristics for the starch. The crosslinked starch must also be pregelatinized to become cold water dispersible. Although this may be accomplished in any conventional manner, the pregelatinization is most desirably accomplished by drum-drying. Any suitable drum-dryer having a single drum or double drums may be used to dry the starch to a moisture level of about 12% or less. The starch slurry is typically fed onto the drum or drums through a perforated pipe or oscillating arm from a tank or vat provided with an agitator and a rotor.

After drying, starch in sheet form may simply be pulverized to the desired particle size. Alternatively, the product may be reduced to flake form. Any conventional equipment such as a Fitz mill or hammer mill may be used to effect suitable pulverizing or flaking.

The remaining constituents of the present foodstuff generally comprise water and such conventional condiments and other flavorants as are desired to enhance or impart desired flavor. By way of example only, these latter constituents include: vegetables, such as onion and carrot; spices, such as pepper; sugar and egg.

In the production of the represent foodstuffs, the particulate fish protein, eggs, water, starch and optional flavorants are first mixed together. This may be done in any conventional manner, desirably until the ingredients are homogeneously dispersed. If any additional flavorants, especially spices, are to be incorporated at this stage, it is preferred that they first be soaked in a portion of the formulation water for at least ten (10) to twenty (20) minutes to allow full hydration. This procedure also allows for their full taste to be developed. The mixture is then formed into the desired shape, ordinarily simply by rolling the mixture into balls under mild pressure.

The shaped foodstuffs are then blanched for 7-10 minutes in an aqueous bath maintained at between 90° and 100° C.

The foodstuffs will start to float in the bath after only a few minutes. It is during this blanching step that the starch is gelled. Significantly, even in the absence of any salt in the bath water, they will not stick to one another as occurs with some other binders.

Once blanching is completed, the foodstuffs may be removed. They will retain their original shapes, even through subsequent steps of packaging.

The foodstuff is then packed into jars or cans and filled with broth or sauce. The container is then hermatically sealed and sterilized for about 60 minutes at 240° F., the exact time and temperature depends among other things on the size of the fish ball and the container used.

The examples which follow are only illustrative of the present invention and are not intended to be limitative. Unless otherwise indicated, all proportions herein are based upon weight.

Throughout the following experiments, the fish was ground in a laboratory meat grinder equipped with a steel plate having holes of 3/16 inches in diameter. The dry ingredients were pre-blended prior to incorporation into the ground fish. In a examples where it was deemed desirable to first hydrate the spices, then the binder (starch, locust bean gum, xanthan gum, matzo meal, etc.) was left out of the dry blend and added later just prior to the addition of eggs and water. In examples where soya protein was used as the binder, it was first hydrated with a portion of the formulation water. Hydration of the spice blend was accomplished within 15-20 minutes at 75° F. While hydration of the soya protein was accomplished within 5-10 minutes.

In all examples, after the spices were added to the ground fish, the egg whites or whole eggs, as indicated, and water were added to wet down the spices and prevent dusting. The ingredients then were mixed with a standard electric mixing device equipped with an egg beater attachment. Mixing was carried out for one minute at low speed and four minutes at medium speed. In these examples, the fish balls were formed by hand, but it is believed that any commercially made forming machine would achieve substantially the same result. The balls used in the experiments weighed between 45 and 47 grams before blanching.

The blanching of the fish balls in the experiments described below was accomplished by dropping the formed fish balls into boiling water (205°-212° F.) immediately after forming. The fish balls were left in the boiling water between 7-10 minutes. After approximately two minutes, the fish balls, as anticipated, floated to the top of the water bath. The weight of the balls after blanching was between 51 and 54 grams.

In the experiments described below, four blanched fish balls were packed into a twelve ounce jar. A hot broth (210°-212° F.) was added to each jar leaving between 3/16 to 5/16 of an inch head space. The broth included pepper, sugar, and onion powder, xanthan and locust bean gums were added to gel the broth.

The jars as described above were capped and processed in a conventional retort vessel using water and steam as the heat sterilization medium. The initial temperature of the fish before retorting was approximately 120° F. The temperature of the process was approximately 240° F. and the process was carried out for approximately 67 minutes. After completion of the retorting process, the packed jars were allowed to cool for approximately twenty minutes.

The fish balls produced in each experiment were subjectively evaluated after their initial formation, after blanching and after processing in jars. The basis for this evaluation is set forth below:

| CHARACTERISTICS EVALUATED | POSSIBLE SCORES |
|---|---|
| I. After Formation | |
| (a) Texture: | |
| balls not pasty or slimy | 3 |
| balls slightly pasty or slimy | 2 |
| balls very pasty or slimy | 1 |
| (b) Binding Properties: | |
| balls are formed easily and bind properly | 3 |
| balls are formed with some difficulty and bind somewhat | 2 |
| balls are difficult to form and do not bind well | 1 |
| II. After Blanching | |
| (a) Color: | |
| nice white to off white color | 3 |
| off white to gray color | 2 |
| gray color | 1 |
| (b) Drop Test: | |
| ball bounces and does not break apart | 3 |
| ball does not bounce and pieces break off | 2 |
| ball completely disintegrates | 1 |
| III. After Processing in Jars | |
| (a) Color: | |
| off white color | 3 |
| gray color | 2 |
| dark gray color | 1 |
| (b) Taste: | |
| good tasting "normal fish" ball | 3 |
| off taste - predominance of 1 or 2 spices | 2 |
| bad tasting fish ball, not characteristic of product | 1 |
| (c) Texture: | |
| firm ball | 3 |
| moderately firm ball | 2 |
| mushy-watery texture | 1 |
| (d) Mouthfeel: | |
| good mouthfeel - product moist but not very watery or pasty | 3 |
| pasty mouthfeel, but not watery | 2 |
| watery - not acceptable | 1 |

The best possible score would be 24 based on the preceding evaluation. The results of the experiments are presented below:

EXAMPLE 1

UNSALTED ALL CARP FISH BALL FORMULATION CONTAINING 2% PREGELATINIZED-MODIFIED WAXY MAIZE STARCH

| INGREDIENT | PERCENT |
|---|---|
| Carp | 67.24 |
| Egg Whites | 16.76 |
| Onions | 4.21 |
| Water | 3.37 |
| Matzo Meal | 2.10 |
| Sugar | 1.67 |
| Spice Blend | 2.52 |
| Pregelatinized Waxy Maize Starch | 2.13 |
| | 100.00 |

The waxy maize starch used in this example had a viscosity in the previously cited range and particle size distribution as follows:

| SIEVE | PERCENT |
|---|---|
| #40 - Percent Retained | 53 |
| #60 - Percent Retained | 27 |
| #80 - Percent Retained | 7 |
| #100 - Percent Retained | 8 |
| #200 - Percent Retained | 4 |
| #230 - Percent Retained | — |
| #230 - Percent Through | 1 |

The evaluation in this example yielded the following results:

| EVALUATION | SCORE |
|---|---|
| I. After Formation | |
| (a) Texture: | 2 |
| (b) Binding Properties: | 3 |
| II. After Blanching | |
| (a) Color: | 3 |
| (b) Drop Test: | 3 |
| III. After Processing in Jars | |
| (a) Color: | 3 |
| (b) Taste: | 3 |
| (c) Texture: | 3 |
| (d) Mouthfeel: | 2 |
| TOTAL SCORE | 22 |
| PERCENTAGE OF MAX. | 91.7% |

EXAMPLE 2

UNSALTED MIXED SPECIES FISH BALL FORMULATION CONTAINING 2% PREGELATINIZED MODIFIED WAXY MAZE STARCH

| INGREDIENT | PERCENT |
|---|---|
| Carp | 39.91 |
| Whitefish | 9.98 |
| Mullet | 9.98 |
| Pike | 6.65 |
| Egg Whites | 16.58 |
| Onions | 4.58 |
| Water | 3.33 |
| Matzo Meal | 2.10 |
| Sugar | 1.65 |
| Spice Blend | 3.13 |

| INGREDIENT | PERCENT |
|---|---|
| Pregelatinized Waxy Maize Starch | 2.11 |
| | 100.00 |

The starch used in this example was substantially identical to the starch in Example 1. The evaluation results were:

| EVALUATION | SCORE |
|---|---|
| I. After Formation | |
| (a) Texture: | 2 |
| (b) Binding Properties: | 3 |
| II. After Blanching | |
| (a) Color: | 3 |
| (b) Drop Test: | 3 |
| III. After Processing in Jars | |
| (a) Color: | 3 |
| (b) Taste: | 3 |
| (c) Texture: | 3 |
| (d) Mouthfeel: | 2 |
| TOTAL SCORE | 22 |
| PERCENTAGE OF MAX. | 91.7 |

EXAMPLE 3

UNSALTED ALL CARP FISH BALL FORMULATION CONTAINING 2% PREGELATINIZED MODIFIED TAPIOCA STARCH

| INGREDIENT | PERCENT |
|---|---|
| Carp | 66.51 |
| Egg Whites | 16.58 |
| Onions | 4.58 |
| Water | 3.32 |
| Matzo Meal | 2.08 |
| Sugar | 1.65 |
| Spice Blend | 3.17 |
| Pregelatinized Modified Tapioca Starch | 2.11 |
| | 100.00 |

For this example the viscosity of the starch again was in the above recited range, while the particle size distribution was as follows:

| SIEVE | PERCENT |
|---|---|
| #40 - Percent Retained | 47 |
| #60 - Percent Retained | 25 |
| #80 - Percent Retained | 9 |
| #100 - Percent Retained | 5 |
| #200 - Percent Retained | 8 |
| #230 - Percent Retained | — |
| #230 - Percent Through | 6 |

The evaluation in this instance yielded the following results:

| EVALUATION | SCORE |
|---|---|
| I. After Formation | |
| (a) Texture: | 2 |
| (b) Binding Properties: | 3 |
| II. After Blanching | |
| (a) Color: | 3 |
| (b) Drop Test: | 3 |
| III. After Processing in Jars | |
| (a) Color: | 3 |
| (b) Taste: | 3 |
| (c) Texture: | 3 |
| (d) Mouthfeel: | 3 |
| TOTAL SCORE | 23 |
| PERCENTAGE OF MAX. | 95.8% |

EXAMPLE 4

UNSALTED ALL CARP FISH BALL FORMULATION CONTAINING 2% PREGELATINIZED MODIFIED TAPIOCA STARCH

| INGREDIENT | PERCENT |
|---|---|
| Carp | 66.51 |
| Egg Whites | 16.58 |
| Onions | 4.58 |
| Water | 3.32 |
| Matzo Meal | 2.08 |
| Sugar | 1.65 |
| Spice Blend | 3.17 |
| Pregelatinized Modified Tapioca Starch | 2.11 |
| | 100.00 |

The starch used in this example was very similar to the starch used in Example 3 with the exception that the particle size distribution was as follows:

| SIEVE | PERCENT |
|---|---|
| #40 - Percent Retained | 1 |
| #60 - Percent Retained | 19 |
| #80 - Percent Retained | 23 |
| #100 - Percent Retained | 24 |
| #200 - Percent Retained | 25 |
| #230 - Percent Retained | — |
| #230 - Percent Through | 8 |

The results of the evaluation were:

| EVALUATION | SCORE |
|---|---|
| I. After Formation | |
| (a) Texture: | 1 |
| (b) Binding Properties: | 3 |
| II. After Blanching | |
| (a) Color: | 3 |
| (b) Drop Test: | 3 |
| III. After Processing in Jars | |
| (a) Color: | 3 |
| (b) Taste: | 3 |
| (c) Texture: | 3 |
| (d) Mouthfeel: | 2 |
| TOTAL SCORE | 21 |
| PERCENTAGE OF MAX. | 87.5% |

EXAMPLE 5

UNSALTED ALL CARP FISH BALL FORMULATION CONTAINING 2% PREGELATINIZED MODIFIED POTATO STARCH

| INGREDIENT | PERCENT |
| --- | --- |
| Carp | 66.51 |
| Egg Whites | 16.58 |
| Onions | 4.58 |
| Water | 3.32 |
| Matzo Meal | 2.08 |
| Sugar | 1.65 |
| Spice Blend | 3.17 |
| Pregelatinized Modified Potato Starch | 2.11 |
| | 100.00 |

The starch used in this example had the following particle size distribution:

| SIEVE | PERCENT |
| --- | --- |
| #4 - Percent Retained | 3 |
| #60 - Percent Retained | 33 |
| #80 - Percent Retained | 27 |
| #100 - Percent Retained | 9 |
| #200 - Percent Retained | 19 |
| #230 - Percent Retained | — |
| #230 - Percent Through | 9 |

The evaluation yielded the following results:

| EVALUATION | SCORE |
| --- | --- |
| I. Formation of Fish Balls | |
| (a) Texture: | 2 |
| (b) Binding Properties: | 3 |
| II. After Blanching | |
| (a) Color: | 3 |
| (b) Drop Test: | 3 |
| III. After Processing in Jars | |
| (a) Color: | 3 |
| (b) Taste: | 2 |
| (c) Texture: | 3 |
| (d) Mouthfeel: | 2 |
| TOTAL SCORE | 21 |
| PERCENTAGE OF MAX. | 87.5% |

EXAMPLE 6

UNSALTED ALL CARP FISH BALL FORMULATION CONTAINING 1% PREGELATINIZED MODIFIED TAPIOCA STARCH

| INGREDIENT | PERCENT |
| --- | --- |
| Carp | 67.23 |
| Egg Whites | 16.75 |
| Onions | 4.63 |
| Water | 3.36 |
| Matzo Meal | 2.10 |
| Sugar | 1.66 |
| Spice Blend | 3.20 |
| Pregelatinized Modified Tapioca Starch | 1.07 |
| | 100.00 |

The starch used herein was identical to the starch used in Example 3. The results of the evaluation were:

| EVALUATION | SCORE |
| --- | --- |
| I. After Formation | |
| (a) Texture: | 3 |
| (b) Binding Properties: | 3 |
| II. After Blanching | |
| (a) Color: | 3 |
| (b) Drop Test: | 3 |
| III. After Processing in Jars | |
| (a) Color: | 3 |
| (b) Taste: | 3 |
| (c) Texture: | 3 |
| (d) Mouthfeel: | 3 |
| TOTAL SCORE | 24 |
| PERCENTAGE OF MAX. | 100% |

EXAMPLE 7

UNSALTED ALL CARP FISH BALL FORMULATION CONTAINING 0.54% PREGELATINIZED MODIFIED TAPIOCA STARCH

| INGREDIENT | PERCENT |
| --- | --- |
| Carp | 67.62 |
| Egg Whites | 16.85 |
| Onions | 4.66 |
| Water | 3.39 |
| Matzo Meal | 2.11 |
| Sugar | 1.67 |
| Spice Blend | 3.16 |
| Pregelatinized Modified Tapioca Starch | .54 |
| | 100.00 |

Again the starch was identical to the starch in Example 3. The evaluation yielded the following results:

| EVALUATION | SCORE |
| --- | --- |
| I. After Formation | |
| (a) Texture: | 3 |
| (b) Binding Properties: | 3 |
| II. After Blanching | |
| (a) Color: | 3 |
| (b) Drop Test: | 3 |
| III. After Processing in Jars | |
| (a) Color: | 3 |
| (b) Taste: | 3 |
| (c) Texture: | 3 |
| (d) Mouthfeel: | 3 |
| TOTAL SCORE | 24 |
| PERCENTAGE OF MAX. | 100% |

EXAMPLE 8

UNSALTED ALL CARP FISH BALL FORMULATION CONTAINING 0.54% PREGELATINIZED MODIFIED POTATO STARCH

| INGREDIENT | PERCENT |
| --- | --- |
| Carp | 67.62 |
| Egg Whites | 16.85 |
| Onions | 4.66 |

-continued

| INGREDIENT | PERCENT |
|---|---|
| Water | 3.39 |
| Matzo Meal | 2.11 |
| Sugar | 1.67 |
| Spice Blend | 3.16 |
| Pregelatinized Modified Potato Starch | .54 |
| | 100.00 |

The starch used here was the same as in Example 5. The evaluation was as follows:

| EVALUATION | SCORE |
|---|---|
| I. After Formation | |
| (a) Texture: | 2 |
| (b) Binding Properties: | 3 |
| II. After Blanching | |
| (a) Color: | 3 |
| (b) Drop Test: | 3 |
| III. After Processing in Jars | |
| (a) Color: | 3 |
| (b) Taste: | 2 |
| (c) Texture: | 3 |
| (d) Mouthfeel: | 2 |
| TOTAL SCORE | 21 |
| PERCENTAGE OF MAX. | 87.5% |

EXAMPLE 9

UNSALTED MIXED SPECIES FISH BALL FORMULATION CONTAINING 5.7% SOY PROTEIN CONCENTRATE

| INGREDIENT | PERCENT |
|---|---|
| Carp | 19.04 |
| Whitefish | 12.00 |
| Mullet | 2.40 |
| Pike | 14.40 |
| Egg Whites | 15.30 |
| Water | 21.00 |
| Matzo Meal | 2.90 |
| Sugar | 2.40 |
| Spice Blend | 4.86 |
| Central Soya - Soy Protein Concentrate | 5.70 |
| | 100.00 |

The evaluation of this formulation was as follows:

| EVALUATION | SCORE |
|---|---|
| I. After Formation | |
| (a) Texture: | 3 |
| (b) Binding Properties: | 2 |
| II. After Blanching | |
| (a) Color: | 2 |
| (b) Drop Test: | 2 |
| III. After Processing in Jars | |
| (a) Color: | 2 |
| (b) Taste: | 1 |
| (c) Texture: | 1 |
| (d) Mouthfeel: | 1 |
| TOTAL SCORE | 14 |
| PERCENTAGE OF MAX. | 58.3% |

EXAMPLE 10

UNSALTED ALL CARP FISH BALL FORMULATION CONTAINING 7.5% SOY PROTEIN CONCENTRATE

| INGREDIENT | PERCENT |
|---|---|
| Carp | 46.64 |
| Egg Whites | 9.30 |
| Onions | 1.90 |
| Water | 25.30 |
| Matzo Meal | 1.60 |
| Sugar | .93 |
| Spice Blend | 6.83 |
| Central Soya - Soy Protein Concentrate | 7.50 |
| | 100.00 |

This soy protein was the same as in Example 9 except for the concentration of soy protein concentrate. The evaluation was as follows:

| EVALUATION | SCORE |
|---|---|
| I. After Formation of Fish Balls | |
| (a) Texture: | 3 |
| (b) Binding Properties: | 2 |
| II. After Blanching | |
| (a) Color: | 2 |
| (b) Drop Test: | 2 |
| III. After Processing in Jars | |
| (a) Color: | 2 |
| (b) Taste: | 1 |
| (c) Texture: | 1 |
| (d) Mouthfeel: | 1 |
| TOTAL SCORE | 14 |
| PERCENTAGE OF MAX. | 58.3% |

EXAMPLE 11

UNSALTED ALL CARP FISH BALL FORMULATION USING HIGH EGG WHITE CONCENTRATION WITHOUT STARCH

| INGREDIENT | PERCENT |
|---|---|
| Carp | 57.00 |
| Egg Whites | 25.00 |
| Onions | 3.40 |
| Water | 3.80 |
| Matzo Meal | 3.40 |
| Sugar | 3.40 |
| Spice Blend | 4.00 |
| | 100.00 |

The evaluation of this test is presented below:

| EVALUATION | SCORE |
|---|---|
| I. After Formation | |
| (a) Texture: | 3 |
| (b) Binding Properties: | 2 |
| II. After Blanching | |
| (a) Color: | 3 |
| (b) Drop Test: | 1 |
| III. After Processing in Jars | |
| (a) Color: | 3 |
| (b) Taste: | 3 |
| (c) Texture: | 1 |
| (d) Mouthfeel: | 2 |

-continued

| EVALUATION | SCORE |
|---|---|
| TOTAL SCORE | 18 |
| PERCENTAGE OF MAX. | 75% |

EXAMPLE 12

UNSALTED ALL CARP FISH BALL FORMULATION CONTAINING 6.7% SOY PROTEIN ISOLATE AND WHOLE EGGS

| INGREDIENT | PERCENT |
|---|---|
| Carp | 46.70 |
| Whole Eggs | 9.30 |
| Onions | 5.60 |
| Water | 16.90 |
| Matzo Meal | 3.70 |
| Sugar | 4.60 |
| Spice Blend | 6.50 |
| Soy Protein Isolate | 6.70 |
| | 100.00 |

The Example yielded the following evaluation:

| EVALUATION | SCORE |
|---|---|
| I. After Formation | |
| (a) Texture: | 2 |
| (b) Binding Properties: | 2 |
| II. After Blanching | |
| (a) Color: | 2 |
| (b) Drop Test: | 2 |
| III. After Processing in Jars | |
| (a) Color: | 2 |
| (b) Taste: | 1 |
| (c) Texture: | 1 |
| (d) Mouthfeel: | 1 |
| TOTAL SCORE | 13 |
| PERCENTAGE OF MAX. | 54.2% |

EXAMPLE 13

UNSALTED ALL CARP FISH BALL FORMULATION CONTAINING .56% LOCUST BEAN GUM

| INGREDIENT | PERCENT |
|---|---|
| Carp | 69.98 |
| Egg Whites | 17.44 |
| Onions | 4.82 |
| Matzo Meal | 2.20 |
| Sugar | 1.73 |
| Spice Blend | 3.27 |
| Locust Bean Gum | .56 |
| | 100.00 |

The evaluation of this Example yielded the following results:

| EVALUATION | SCORE |
|---|---|
| I. After Formation | |
| (a) Texture: | 2 |
| (b) Binding Properties: | 2 |
| II. After Blanching | |
| (a) Color: | 2 |
| (b) Drop Test: | 2 |

-continued

| EVALUATION | SCORE |
|---|---|
| III. After Processing in Jars | |
| (a) Color: | 2 |
| (b) Taste: | 2 |
| (c) Texture: | 2 |
| (d) Mouthfeel: | 2 |
| TOTAL SCORE | 16 |
| PERCENTAGE OF MAX. | 66.6% |

EXAMPLE 14

UNSALTED ALL CARP FISH BALL FORMULATION CONTAINING .56% XANTHAN GUM

| INGREDIENT | PERCENT |
|---|---|
| Carp | 69.98 |
| Egg Whites | 17.44 |
| Onions | 4.82 |
| Matzo Meal | 2.20 |
| Sugar | 1.73 |
| Spice Blend | 3.27 |
| Xanthan Gum | .56 |
| | 100.00 |

The evaluation of this last Example resulted in the following:

| EVALUATION | SCORE |
|---|---|
| I. After Formation | |
| (a) Texture: | 2 |
| (b) Binding Properties: | 2 |
| II. After Blanching | |
| (a) Color: | 2 |
| (b) Drop Test: | 1 |
| III. After Processing in Jars | |
| (a) Color: | 2 |
| (b) Taste: | 1 |
| (c) Texture: | 1 |
| (d) Mouthfeel: | 1 |
| TOTAL SCORE | 12 |
| PERCENTAGE OF MAX. | 50% |

EXAMPLE 15

UNSALTED ALL CARP FISH BALL FORMULATION CONTAINING TAPIOCA STARCH (NOT PREGELATINIZED)

| INGREDIENT | PERCENT |
|---|---|
| Carp | 67.24 |
| Egg Whites | 16.76 |
| Onions | 4.21 |
| Water | 3.37 |
| Matzo Meal | 2.10 |
| Sugar | 1.67 |
| Spice Blend | 2.52 |
| Modified Tapioca Starch | 2.13 |
| | 100.00 |

The modified tapioca starch used in this example had a viscosity in the previously cited range and the following particle size distribution:

| SIEVE | PERCENT |
|---|---|
| #40 - Percent Retained | — |
| #60 - Percent Retained | — |
| #80 - Percent Retained | — |
| #100 - Percent Retained | — |
| #200 - Percent Retained | 27 |
| #230 - Percent Retained | 62 |
| #230 - Percent Through | 11 |

The evaluation in this example yielded the following results:

| EVALUATION | SCORE |
|---|---|
| I. After Formation | |
| (a) Texture: | 2 |
| (b) Binding Properties: | 2 |
| II. After Blanching | |
| (a) Color: | 2 |
| (b) Drop Test: | 3 |
| III. After Processing in Jars | |
| (a) Color: | 2 |
| (b) Taste: | 2 |
| (c) Texture: | 2 |
| (d) Mouthfeel: | 2 |
| TOTAL SCORE | 17 |
| PERCENTAGE OF MAX. | 70.8% |

The best possible score would be 24 points or 100%. Fish balls manufactured with a modified, pregelatized starch that would have excellent characteristics should score between 20 to 24 points or 83.5 to 100%. It is readily evident from examples 3, 6 and 7 that the scores can be improved even with a given starch; i.e., pregelatized modified tapioca starch by adjusting the starch level between 0.54–1%. Using a non-pregelatized starch as in example 15 results in inferior fish balls which received a score of 70.8%. Examples 9–14 teach that other binding agents such as soy protein concentrate, soy protein isolate, egg whites, Locust Bean gum and Xanthan gum cannot be used without markedly affecting the overall quality of the fish ball. The latter is exhibited by the low scores that the fish balls received.

What is claimed is:

1. A substantially salt free integrally shaped fish product comprising comminuted fish substantially homogeneously dispersed within a gelled matrix binder formed by admixture of water with crosslinked, pregelatinized starch particles at a level of from 0.2 to 3% by weight of the fish product, said fish product having less than 40 mg of sodium per 100 grams.

2. The fish product of claim 1, wherein the starch in cross-linked form is pregelatinized by drum-drying.

3. The fish product of claim 1 wherein the starch has the following particle size distribution:

| Sieve #40 | Percent Retained | 47–53 |
|---|---|---|
| Sieve #60 | Percent Retained | 25–27 |
| Sieve #80 | Percent Retained | 7–9 |
| Sieve #100 | Percent Retained | 5–8 |
| Sieve #200 | Percent Retained | 4–8 |
| Sieve #230 | Percent Retained | — |
| Sieve #230 | Percent Through | 1–6 |

4. The fish product of claim 3, wherein the starch has a Brabender viscosity of between 800 and 1400 B.U. at 7% solids.

5. The fish product of claim 4, wherein the starch has a Brabender viscosity of less than 3100 B.U. at 5% solids.

6. The fish product of claim 5, wherein the starch in cross-linked form is pregelatinized by drum-drying.

7. The fish product of claim 5, wherein the sodium content is between 20 and 25 mg. per 100 grams.

8. The fish product of claim 1, wherein the starch may be derived from corn, potato, tapioca or wheat.

* * * * *